United States Patent [19]
Guerout et al.
[11] Patent Number: 4,525,927
[45] Date of Patent: Jul. 2, 1985

[54] METHOD AND APPARATUS FOR CONNECTING AN INSULATING HOUSING OF A CONNECTOR AND A COVER

[75] Inventors: Jean B. Guerout, Conflans Saint Honorine; Jack Urbin, Triel, both of France

[73] Assignee: AMP Incorporated, Harrisburg, Pa.

[21] Appl. No.: 463,710

[22] Filed: Feb. 4, 1983

[30] Foreign Application Priority Data

Feb. 10, 1982 [FR] France ................................ 82 02153

[51] Int. Cl.³ ........................ H01R 43/04; B23P 19/00

[52] U.S. Cl. ........................................ 29/861; 29/749; 29/753

[58] Field of Search ...................... 29/759, 564.4, 749, 29/753, 876, 752, 747, 863, 881, 861, 865, 866

[56] References Cited

U.S. PATENT DOCUMENTS

| | | | |
|---|---|---|---|
| 3,329,002 | 7/1967 | Schwalm | 29/753 X |
| 3,474,397 | 10/1969 | Piasecki | 339/198 |
| 3,504,416 | 4/1970 | Schick . | |
| 3,747,190 | 7/1973 | Erlichman et al. | 29/753 X |
| 3,875,662 | 4/1975 | Folk | 29/753 X |
| 4,031,613 | 6/1977 | Brown et al. | 29/863 |
| 4,043,034 | 8/1977 | Sucheski et al. | 29/749 |
| 4,137,624 | 2/1979 | Davis et al. | 29/566.1 |
| 4,281,442 | 8/1981 | Senior et al. | 29/749 X |

*Primary Examiner*—Howard N. Goldberg
*Assistant Examiner*—Carl J. Arbes
*Attorney, Agent, or Firm*—Robert W. J. Usher

[57] ABSTRACT

In a method of, and apparatus for, mating an insulating housing of an electrical connector and a cover for the housing, to terminate an electrical conductor inserted between the housing and the cover, to an electrical terminal in the housing, the leading connector of a row of connectors fed towards a support, is positioned on the support, the conductor is inserted between the cover and the connector and a terminating punch is applied to the cover to mate it with the housing. The connectors of the row are detachably joined together in the form of a strip and a column of covers is also fed in the direction of the support to position the leading cover of the column between the punch and the support. When the housing of the leading connector has been mated with the leading cover, the leading connector and the next following connector of the strip are relatively displaced to detach the leading connector from the strip.

10 Claims, 11 Drawing Figures

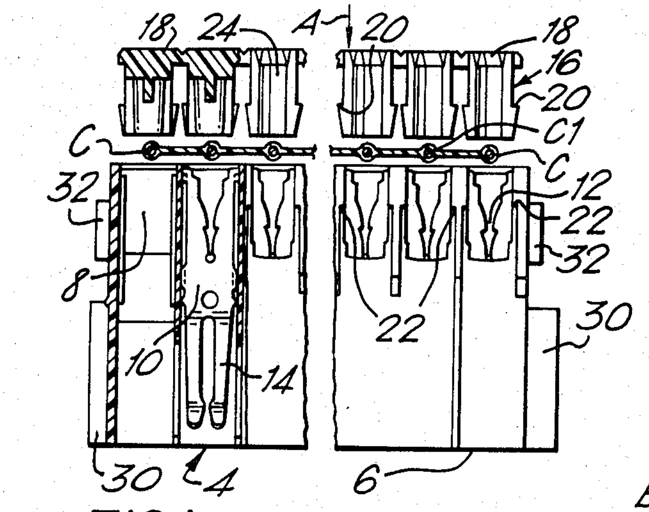
FIG.1.
FIG.3.
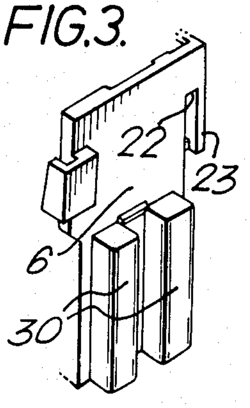
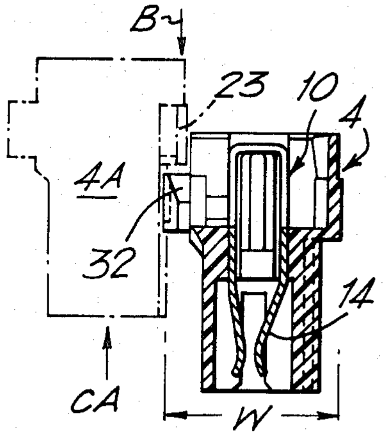
FIG.2.
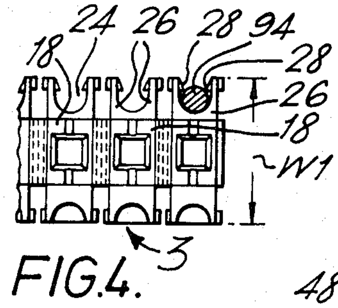
FIG.4.
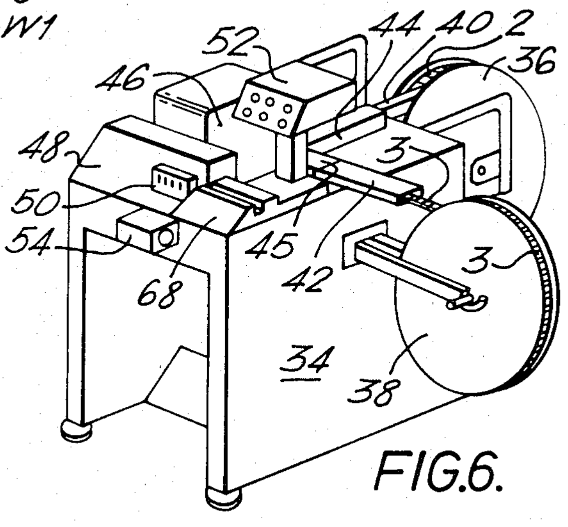
FIG.6.
FIG.5.
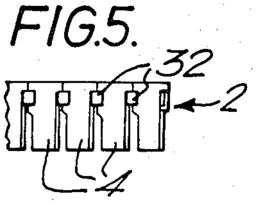

METHOD AND APPARATUS FOR CONNECTING AN INSULATING HOUSING OF A CONNECTOR AND A COVER

This invention relates to a method of, and apparatus for, terminating an electrical conductor to an electrical connector.

There is disclosed in U.S. Pat. No. 4,040,179, a method of terminating an electrical conductor to an electrical connector, in which method the leading connector of a row of connectors is fed onto a support and a terminating member is then employed to terminate the conductor to an electrical terminal of the connector.

In this known method, which is carried out by means of apparatus accommodating a supply of the connectors, the connectors are fed to the support in loose piece form. The length of the row of connectors which can be stored in the apparatus is accordingly limited by its dimensions.

The method and apparatus of the present invention are employed with connectors that are detachably joined together so that a strip of connectors, of any desired length, can be provided for winding about a storage reel.

Although according to common practice, electrical connectors may be fed to a connector support by means of a continuous tape to which the connectors are adhered at evenly spaced intervals, this method of supply is only practicable where each connector has a flat surface of sufficient area satisfactorily to accommodate the tape; also the cost of suitable adhesive is high, being for example, at least five percent of the cost of the connectors to be adhered to the tape.

According to one aspect of the invention, in a method as defined in the first paragraph of this specification, the connectors of the row are initially detachably coupled by means of interengaging projection and receptacle members; and, after the termination of the conductor, the leading connector is raised relative to the next following connector to detach it from the next following connector, the next following connector is retracted from the leading connector, and the leading connector is transported away laterally of the row of connectors.

It is known per se from U.S. Pat. No. 3,474,397, detachably to couple the modules of a modular terminal block by means of interengaging projection and receptacle members, the terminals of the modules having flat electrical tabs for connecting wires thereto.

The invention may be applied to the termination of electrical conductors to connectors provided with covers.

U.S. Pat. No. 4,040,179 also discloses a method of mating an insulating housing of an electrical connector and a cover for the housing, to terminate an electrical conductor inserted between the housing and the cover, to an electrical terminal in the housing, in which method the leading connector of a row of connectors fed towards a support, is positioned on the support, the conductor is inserted between the cover and the connector, a terminating punch is applied to the cover to mate it with the housing, and the punch is withdrawn from the cover.

According to another aspect of the invention, in a method as defined in the preceding paragraph of this specification, the connectors of the row are detachably joined together by means of interengaging projection and receptacle members on the housings of the connectors to provide a strip of connectors, and a column of covers is also fed in the direction of the support to position the leading cover of the column between the punch and the support in such a way that the conductor can be inserted between the leading cover and the leading connector prior to the application of the punch to the leading cover; and when the housing of the leading connector has been mated with the leading cover and the punch has been withdrawn from the leading cover, the leading connector and the next following connector of the strip are relatively displaced transversely of the strip to disengage the interengaging members joining the leading connector to the next following connector.

The invention may conveniently be applied to the termination of the conductors of a flat flexible cable.

According to a further aspect thereof, the invention consists in apparatus for mating an insulating housing of an electrical connector and a cover for the housing to terminate electrical conductors inserted between the housing and the cover, each to an electrical terminal in the housing, the apparatus comprising a terminating punch, a connector support anvil, means for moving the punch through a working stroke towards the anvil and through a return stroke away from the anvil, a track for accommodating a row of connectors and means for feeding the row of connectors towards the anvil to position the leading connector of the row on the anvil when the punch is in a position remote from the anvil, to enable the punch to engage the cover to mate the housing of the leading connector therewith during the working stroke of the punch; wherein there are provided a magazine for accommodating a column of the covers, means for feeding the column of covers in the direction of the anvil to position the leading cover of the column at a location between the punch, when in its position remote from the anvil and the anvil, means releasably to retain the leading cover in such location, for displacement towards the leading connector by the punch and means for displacing the leading connector towards the punch when the housing of the leading connector has been mated with the leading cover and the punch has been withdrawn from the leading cover, thereby to disengage the leading connector from a strip of the connectors to which the leading connector is detachably connected.

Conveniently, the covers are cut from a strip of covers formed integrally with one another and are severed from the strip prior to being inserted into the magazine. The strip of covers can be wound about a further storage reel attached to the apparatus.

For a better understanding of the invention, an embodiment thereof will now be described, by way of example, with reference to the accompanying drawings in which:

FIG. 1 is an elevation, shown partly in section, of an electrical connector, a cover therefor and a cable positioned between the connector and the cover;

FIG. 2 is a cross sectional view of the connector in association with a similar connector which is shown schematically;

FIG. 3 is a perspective view of an end of the connector;

FIG. 4 is a top plan view of part of a strip comprising a series of connector covers according to FIG. 1 and also shows in cross-section a pin engaging the strip;

FIG. 5 is a schematic elevational view of electrical connectors according to FIGS. 1 to 3, connected together to form a strip of connectors;

FIG. 6 is a schematic perspective view of an embodiment of apparatus for terminating cables to electrical connectors according to FIG. 1;

Figure 7:
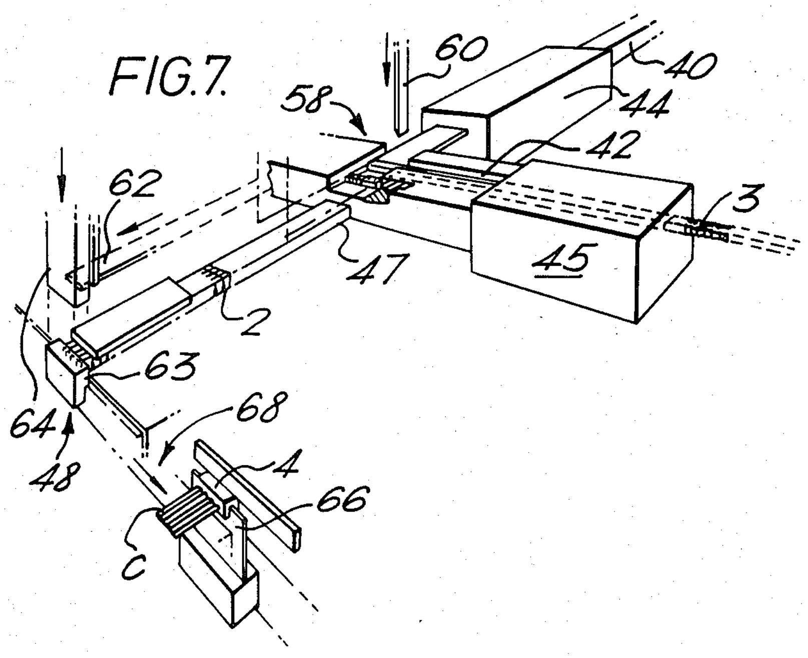
FIG. 7 is a diagrammatic perspective view illustrating, in outline, the operation of the apparatus.

The apparatus according to the embodiment described below is for use in terminating cables, and especially flat flexible cables, by means of electrical connectors as disclosed in U.S. Pat. No. 4,317,608, but having been modified, as described below, so as to be detachably connectable together to form a continuous strip 2 (FIGS. 2 and 5) of connectors 4.

As shown in FIGS. 1 to 5, each connector 4 comprises an insulating housing 6, having a row of through cavities 8 each having supported therein a loop-shaped electrical terminal 10 having a conductor-receiving opening 12 at one end and a contact receptable portion 14 at the other end. Each connector 4 has an insulating cover 16 for mating with the housing 6 and comprising a series of plugs 18 formed integrally with one another. Each plug 18 is dimensioned for insertion, in the direction of the arrow A in FIG. 1, into an individual cavity 8 to drive a conductor C1 of a flat flexible cable C, placed between the cover 16 and to the top of the housing 6, (FIG. 1) down into the opening 12 of the terminal 10 in the cavity, so that the edges of the opening 12 make permanent electrical contact with the conductor C1. The plugs 18 have barbs 20 which upon full insertion of the plugs, engage latchingly with shoulders 22 in the cavities 8 to retain the plugs 18 therein, these shoulders being connected by a depending flange 23 on one side of the housing 6. Each plug 18 is formed with a channel 24 (FIG. 4) bounded by resilient arms 26 provided with barbs 28 at their free ends. For use with the apparatus, a series of the covers 16 are formed integrally with one another in the form of a continuous strip 3, part of which is shown in FIG. 4.

At each end thereof, the housing 6 has spaced mounting lugs 30 (FIGS. 1 and 3).

Also at each end of the housing 6, on the opposite side thereof to the flange 23, is a receptacle 32 formed integrally with the housing and being adapted to receive, in the direction of the arrow B in FIG. 1, a projection in the form of a respective end (FIG. 3) of the flange 23 of an identical connector 4A (shown schematically), so that any desired number of connectors 4 can be interconnected to form the strip 2 as shown in FIG. 5. The connector 4A can be disengaged from the connector 4 by displacing it, relative to the conductor 4, in the direction of the arrow CA in FIG. 2 to withdraw the flanges 23 of the connector 4A from the receptacles 32 of the connector 4.

As shown schematically in FIG. 6, the apparatus comprises a frame 34 on which are mounted a first storage reel 36, about which a strip 2 of the connectors 4 is wound, and a second storage reel 38 about which a continuous strip 3 of covers 16 is wound, guides 40 and 42 for the respective strips 2 and 3 extending at right angles to one another, from the reels 36 and 38, a connector and cover feed assembly 44, a cover feed assembly 45, a pneumatic press assembly 46, a cable terminating assembly 48 provided with a cable guide assembly 50, an electronic control unit 52, a start switch 54, and a wire connector removal track 68.

The operation of the apparatus will now be described in outline with reference to FIG. 7.

Towards the end of each cycle of operation of the apparatus, the strip 3 of covers is fed by the assembly 45 through a cover severing station 58 at which the leading end portion of the strip 3 is severed by a cutter 60 to provide a single cover 16, after the leading end portion has entered a cover magazine 62 which has been previously filled with covers 16 arranged in a column with the covers 16 extending at right angles to the length of the magazine. The feed assembly 44 advances both the strip 2 (down a track 47) and the column of covers 16, so that the leading connector 4 of the strip 2 is positioned on a connector support anvil 63 of the terminating assembly 48 beneath a terminating punch 64 thereat, and so that the leading cover 16 in the magazine 62 is positioned, as described below, above the leading connector 4 on the anvil 63. The operator inserts an end of a flat flexible cable C to be terminated, between cable guide elements (described below) of the assembly 50, above the leading connector 4 but below the leading cover 16. In order to initiate the next cycle of operation of the apparatus, the operator actuates the switch 54 to activate the press assembly 46 which causes the punch 64 to descend so as to drive the cover 16 therein down upon the cable end and the leading connector, to terminate each cable conductor C1 to one of the terminals 10 of the connector. A transporter fork 66 positioned, at this time, in the anvil 63 below the connector thereon, is now raised so as to engage the wired leading connector to raise it relative to the next following connector of the strip 2 to detach the leading connector therefrom. The strip 2 from which the wired connector has now been detached is then retracted by a few millimeters by the feed assembly 44 so as to be clear of the wired connector. The fork 66 is then transported, with the wired connector thereon, along the track 68 to a position at which the fork 66 is stopped and lowered and at which the wired connector is removed from the track 68. The fork 66 is then returned to its starting position. The operations described above are carried out under the control of the unit 52.

The apparatus and its operation will now be described in greater detail with reference to FIGS. 8 to 11.

The track 47 and the anvil 63 are secured to a base 89.

Figure 10:
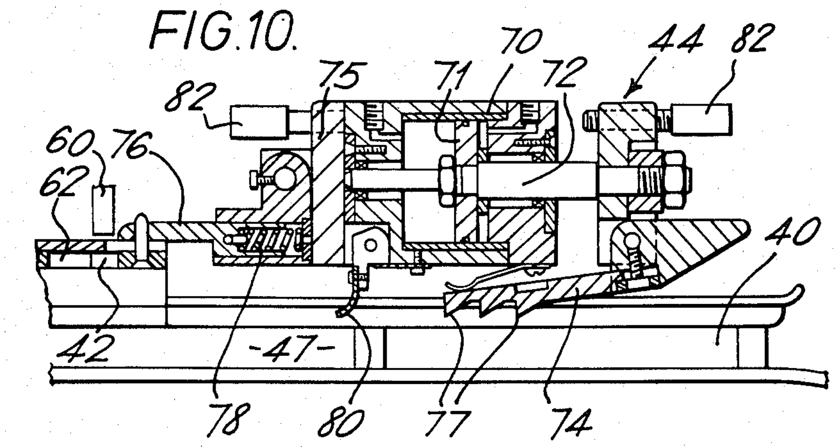
FIG. 10 is an enlarged fragmentary sectional view of the apparatus showing a connector and connector cover feed assembly thereof.

As shown in FIG. 10, the feed assembly 44 comprises a feed pneumatic cylinder 70 having a piston 71 with a piston rod 72 carrying on one end a spring loaded connector feed finger 74, the other end of the rod 72 engaging an abutment plate 75 of a cover feed finger 76 protruding into one end of the magazine 62.

The feed finger 74, which is spring loaded downwardly (as seen in FIG. 10) has connector driving tips 77 which project into the connector feed track 47 which communicates with the guide 40. As the piston rod 71 is moved leftwardly, as seen in FIG. 10, under the command of the control unit 52, the tips 77 engage the tops of the housings of the connectors of the strip 2 in the track 47 to drive the strip 2 leftwardly down the track 47, towards the anvil 63 by the width (W in FIG. 2) of one connector 4. The piston rod 72 also drives the feed finger 76 leftwardly (as seen in FIG. 10), against the action of a return spring 78, to advance the column of covers in the magazine 62 by the width (W1 in FIG. 4) of one cover 16, towards the cable guide assembly 50. The strip 2 is held down in the track 47 by means of a resilient hold down blade 80 on the cylinder 70. The travel of the piston 71 is controlled by means of sensors 82 connected to the control unit 52.

Figure 8:
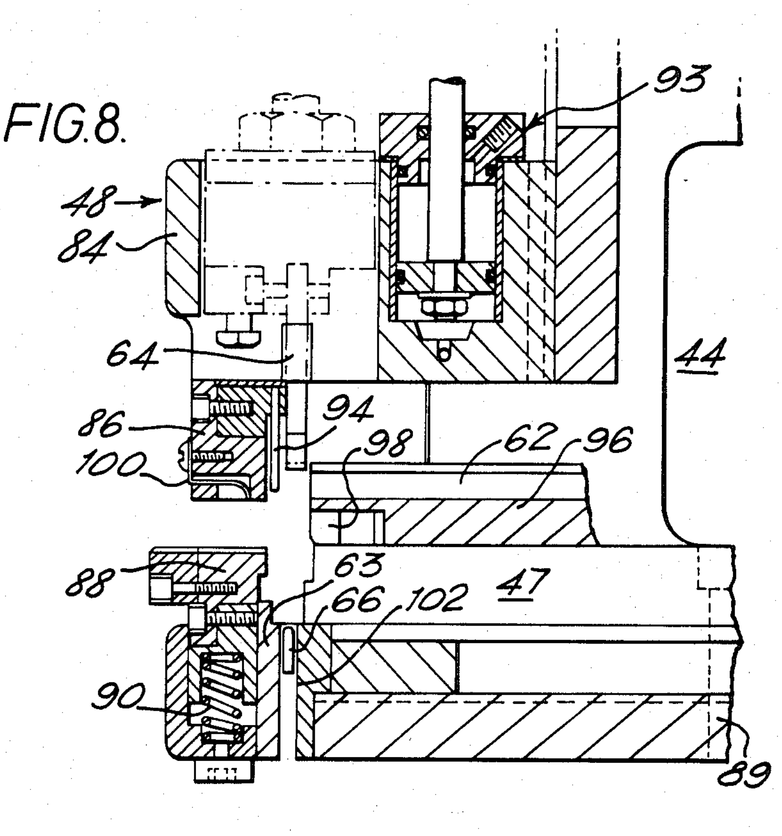
FIG. 8 is an enlarged fragmentary lateral section view of the apparatus, showing a connector terminating assembly thereof.
Figure 9:
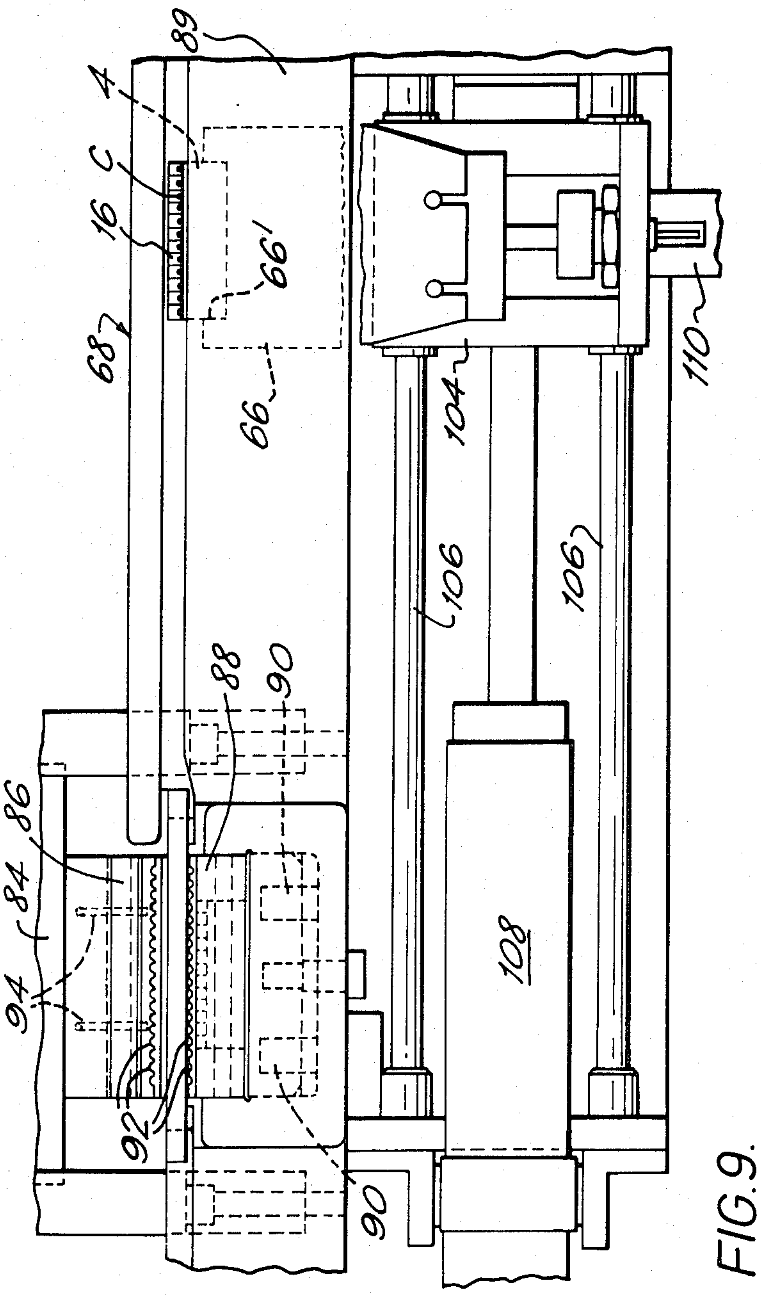
FIG. 9 is an enlarged fragmentary front elevation of the apparatus.

The terminating assembly 48 comprises a punch housing 84 in which the terminating punch 64 is slidably mounted and which carries an upper cable guide 86, as shown in FIGS. 8 and 9, for co-operation with a lower cable guide 88 mounted on return springs 90. The guides 86 and 88 have cable gripping teeth 92 (FIG. 9) defining indentations for receiving the cable conductors. The cable guide 86 is arranged to be raised and lowered by means of a piston-and-cylinder unit 93 on the housing 84. The guide 86 has a fully raised position as shown in FIGS. 8 and 9. A pair of cover retaining pins 94 depend from the housing 84, between the cable guide 86 and the punch 64, in spaced relationship in the transverse direction of the magazine 62. A plate 96 separating the track 47 and magazine 62 carries at its end nearest to the guides 86 and 88, an axially adjustable cable stop 98. A curved, resilient cable hold-down plate 100 is provided in a recess in the cable guide 86. The fork 66, which is vertically slidable in a slot 102 in the anvil 63 is attached to a fork carriage 104, which is driven horizontally between its positions of FIGS. 8 (in which only part of the fork is shown) and 9, along guide rods 106 beneath the base 89, by means of a fork transfer pneumatic piston-and-cylinder unit 108. The carriage 104 carries a fork raising and lowering pneumatic piston-and-cylinder unit 110, part of which is shown in FIG. 9.

Each cover 16 in the column of covers in the magazine 62, is positioned with its arms 26 facing in the direction of advance of the covers by the feed finger 76. As the leading cover 16 is advanced towards the cable guide 86, each of the pins 94 enters a channel 24 at one end of the leading cover 16 and is resiliently engaged between the arms 26 bounding those channels 24 (see FIGS. 4 and 11), so that the leading cover 16 is held releasably in position above the leading connector 4, as shown in FIG. 11, on the anvil 63.

Prior to an operating cycle of the apparatus, with the leading cover 16 and the leading connector 4 positioned as just described, the fork 66 is in the channel 102, with its tines 66′ below the leading connector 4. The punch 64, the housing 84 and the cable guide 86, as well as the cable guide 88, are in their raised positions as shown in FIG. 8. The cable guide 86 is in a partially lowered position but is not in contact with the cable guide 88.

Figure 11:
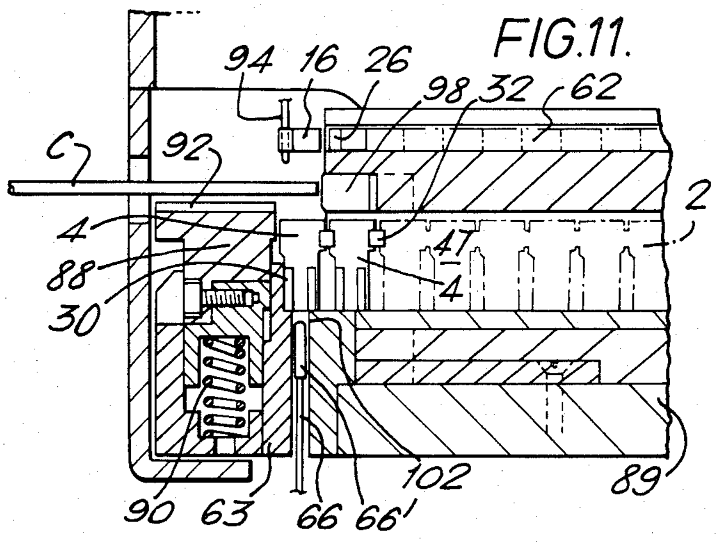
FIG. 11 is an enlarged fragmentary sectional view, with parts omitted, illustrating details of FIG. 8 at the start of a cycle of operation of the apparatus.

The operator now inserts an end of the cable C between the cable guides 86 and 88 to engage the wire stop 98, as shown in FIG. 11. The operator then actuates the switch 54.

The piston-and-cylinder unit 93 depresses the housing 84 and thus the cable guide 86, so that the cable C is gripped between the cable guides 86 and 88, the guide 88 being depressed by the guide 86 against the action of the return springs 90. In this position of the guides 86 and 88, the end portion of the cable C lies against the top of the connector 4 and is held there against by the downwardly directed free end of the plate 100, and the leading cover 16 is positioned against the free end portion of the cable C. The punch 64 is now driven down by a pneumatic piston-and-cylinder unit (not shown) of the assembly 46, thereby driving the leading cover 16 down along, and off, the pins 94 so that the plugs 18 of the cover force the conductors C1 of the end portion of the cable C into the openings 12 of the terminals 10 of the leading connector 4, thereby to terminate the cable C.

The housing 84 and thus the cable guide 86, and the punch 64 are now returned to their initial positions (fully raised in the case of the guide 86) by their respective piston-and-cylinder units, the cable guide 88 is returned to its initial position by the springs 90, and the fork 66 is raised by the piston-and-cylinder unit 110 so that the tines 66′ of the fork 66 engage between the lugs 30 at the respective ends of the leading connector 4 which is thereby seated between the tines 66′, the fork 66 being raised to an extent to withdraw the flange 23 of the leading connector 4 from the receptacles 32 of the next following connector of the strip 2.

The piston rod 72 is then moved rightwardly (as seen in FIG. 10) by the piston 71, so that feed fingers 74 and 76 are returned to their FIG. 10 positions and the feed assembly 45 feeds a further cover 16 into the magazine 62.

As the feed finger 74 is thus returned, it retracts the strip 2 of connectors 4 away from the detached and wired leading connector 4 (for example, by about 2 mm), until the strip 2 is arrested by the hold down blade 80. The tips 77 of the finger 74 thereafter ride along the top of the strip 2 to the extent of a connector width. By virtue of the retraction of the strip 2, the next following connector 4 is withdrawn from the leading connector 4 to free it for transport by the fork 66. The piston-and-cylinder unit 108 is now actuated to move the fork 66 out of the slot 102 and along the track 56 (rightwardly, as seen in FIG. 9) to a connector removal end position.

The fork 108 is now lowered by the unit 110, leaving the wired connector in the track 68, and the wired connector is removed from the track 68. The fork 66 is then returned to its FIGS. 8 and 11 position in the slot 102 by the unit 108, the cutter 60 is actuated by a pneumatic piston-and-cylinder unit (not shown) to sever from the strip 3, the cover 16 last fed into the magazine 62 by the assembly 45, the piston rod 72 is moved leftwardly, as seen in FIG. 10, to feed a further cover 16 and connector 4 to the terminating assembly 48, and the cable guide 86 is depressed to its partially lowered position.

The feed assembly 45, which may be constructed in any convenient manner, includes a pneumatically driven feed finger controlled by the unit 52.

The unit 52 is provided with control buttons whereby the parts may be individually cycled for setting up or test purposes.

Instead of providing the switch 54, the cable stop 98 may be constructed as a switch element for actuation by the end of the cable C to initiate a cycle of operation of the apparatus.

The apparatus described above may be modified so as to be capable of wiring a plurality of connectors simultaneously, instead of only one. To this end a plurality of reels 36, guides 40 and assemblies 44 may be provided in juxtaposition, as well as an equal plurality of juxtaposed magazines 62, cutters 60 and pairs of pins 94. Only one reel 38 is required, however. Where the sum of the lengths of the connectors exceeds that of a connector 4, the fork 66 may be appropriately enlarged lengthwise of the track 68. As will be apparent from FIG. 9, the cable terminating assembly is longitudinally dimensioned to allow of such modification. It can, however, if necessary, be replaced by a similar assembly of greater length.

What is claimed is:

1. A method of terminating respective individual electrical conductors sequentially to respective individual electrical connectors which are detachably coupled together by means of interengaging projection and receptacle members to form a row, comprising the steps of feeding the leading connector of the row of connectors onto a support, inserting a conductor proximate to an electrical terminal of the leading connector, employing a terminating member to terminate the conductor to the electrical terminal of the connector, raising the leading connector relative to a next following connector after the termination of the conductors thereby detaching the leading connector from the next following connector, retracting the next following connector from the leading connector, and transporting the leading connector away laterally of the row of connectors.

2. A method of terminating respective individual electrical conductors sequentially to respective individual electrical terminals of respective individual electrical connectors detachably joined together by means of interengaging projection and receptacle members on housings of the connectors forming a strip of connectors by mating covers with the respective housings with the conductors interposed therebetween, which method comprises the steps of feeding a leading connector of the strip towards and positioning the leading connector on a support, feeding a column of covers in the direction of the support to position the leading cover of the column between a terminating punch and the support, inserting a conductor between the leading cover and the leading connector, applying a terminating punch to the leading cover to mate it with the housing thereby to terminate the conductor, withdrawing the punch from the cover, and subsequently displacing the leading connector and the next following connector of the strip relatively to each other transversely of the strip to disengage the interengaging members joining the leading connector to the next following connector.

3. A method according to claim 2 comprising the step of retracting the strip of connectors after the disconnection of the interengaging members to free the leading connector for transport laterally away from the support transversely of the length of the strip and of the direction of movement of the punch.

4. Apparatus for terminating respective individual electrical conductors sequentially to respective individual electrical terminals of respective individual electrical connectors detachably joined together by means of interengaging projection and receptacle members on housings of the connectors to form a strip of connectors by mating covers with the respective housings with the conductors interposed therebetween, the apparatus comprising a frame, a terminating punch and a connector support anvil mounted on the frame, means operatively associated with the frame to move the punch through a working stroke towards the anvil and through a return stroke away from the anvil, a track on the frame extending to the anvil for accommodating a row of connectors and feed means on the frame adjacent the track arranged to feed the row of connectors along the track towards the anvil to position the leading connector of the row on the anvil when the punch is in a position remote from the anvil, to enable the punch to engage the cover to mate the housing of the leading connector therewith during the working stroke of the punch, which apparatus further includes a magazine on the frame arranged to accommodate a column of the covers extending towards the anvil, means on the frame for feeding the column of covers in the direction of the anvil to position the leading cover of the column at a location between the punch, when in its position remote from the anvil and the anvil, means on the frame adjacent the anvil to releasably retain the leading cover in such location, for displacement towards the leading connector by the punch and means on the frame arranged to displace the leading connector towards the punch when the housing of the leading connector has been mated with the leading cover and the punch has been withdrawn from the leading cover, thereby to disengage the leading connector from a strip of the connectors to which the leading connector is detachably connected.

5. Apparatus according to claim 4, wherein the connector feeding means comprises a feed member, which is movable through a working stroke parallel to the track to advance the strip of connectors along the track towards the support anvil, and through a return stroke away from the support anvil, during which stroke the strip of connectors is retracted until a connector of the strip engages a stop projecting into the feed path of the strip.

6. Apparatus according to claim 4, wherein the means of retaining the leading cover comprises a pin extending adjacent and parallel to the path of movement of the punch, for resilient engagement in a recess in the leading cover.

7. Apparatus according to claim 6, wherein the pin is provided on a first conductor guide on the side of the punch remote from the magazine, the first conductor guide being arranged to move ahead of the punch during its working stroke to depress a second conductor guide to position the conductors between the guides on the housing of the leading connector.

8. Apparatus according to claim 4, wherein the means for displacing the leading connector towards the punch comprises a fork providing a seat for the connector, the fork being mounted on a carriage incorporating a first drive unit arranged to displace the fork towards and away from the punch, and a second drive unit arranged to move the fork between a first position beneath the punch and a second position which is laterally displaced from the anvil.

9. Apparatus according to claim 8, wherein the movement of the fork towards a second position conveys the connector along a track, the fork being lowered upon arrival at its second position to leave the connector in the track.

10. Apparatus according to any one of claims 4, 5 or 6, wherein a feed track for a strip of the covers formed integrally with one another communicates with the magazine, a cutter being mounted on the frame for reciprocation relative to the feed track for the strip to sever the leading end portion of the strip of covers at the junction between the feed track and the magazine.

* * * * *